United States Patent [19]

Mayo et al.

[11] Patent Number: 5,182,382

[45] Date of Patent: * Jan. 26, 1993

[54] PROCESSES FOR THE PREPARATION OF TITANIUMPHTHALOCYANINE TYPE X

[75] Inventors: James D. Mayo, Toronto; James M. Duff, Mississauga; Terry L. Bluhm, Oakville; Cheng K. Hsiao, Mississauga, all of Canada

[73] Assignee: Xerox Corporation, Stamford, Conn.

[*] Notice: The portion of the term of this patent subsequent to Nov. 24, 2009 has been disclaimed.

[21] Appl. No.: 706,495

[22] Filed: May 28, 1991

[51] Int. Cl.$^5$ ............................................. C09B 67/50
[52] U.S. Cl. ..................................... 540/141; 540/142; 540/143; 430/58; 430/59; 430/78
[58] Field of Search ................... 540/141, 142, 143

[56] References Cited

U.S. PATENT DOCUMENTS

| | | | |
|---|---|---|---|
| 3,825,422 | 7/1974 | Gruber et al. | 96/1 PE |
| 3,927,026 | 12/1975 | Brach et al. | 260/314.5 |
| 4,443,528 | 4/1984 | Tamura et al. | 430/56 |
| 4,458,004 | 7/1984 | Tanakawa | 430/270 |
| 4,536,461 | 8/1985 | Nakatani et al. | 430/58 |
| 4,607,124 | 8/1986 | Kazmaier et al. | 564/307 |
| 4,643,770 | 2/1987 | Hays | 106/23 |
| 4,664,997 | 5/1987 | Suzuki et al. | 430/58 |
| 4,701,396 | 10/1987 | Hung et al. | 430/58 |
| 4,725,519 | 2/1988 | Suzuki et al. | 430/58 |
| 4,728,592 | 3/1988 | Ohaku et al. | 430/59 |
| 4,771,133 | 9/1988 | Liebermann et al. | 540/143 |
| 4,777,251 | 10/1988 | Tanaka et al. | 540/143 |
| 4,882,427 | 11/1989 | Enokida et al. | 540/141 |
| 4,898,799 | 2/1990 | Fujimaki et al. | 430/59 |

FOREIGN PATENT DOCUMENTS

| | | | |
|---|---|---|---|
| 0314100 | 5/1989 | European Pat. Off. | 540/141 |
| 2-69776 | 11/1990 | Japan . | |

*Primary Examiner*—Mukund J. Shah
*Assistant Examiner*—Jyothsna Venkat
*Attorney, Agent, or Firm*—E. O. Palazzo

[57] ABSTRACT

A process for the preparation of titanyl phthalocyanine Type X which comprises dissolving titanyl phthalocyanine Type I in a solution of trifluoroacetic acid and methylene chloride; adding the resultant solution to a solvent enabling precipitation of Type X titanyl phthalocyanine; separating the titanyl phthalocyanine Type X from the solution; followed by a first washing with an organic solvent and a second washing with water; and thereafter a solvent treatment with fluorobenzene.

20 Claims, 6 Drawing Sheets

PROCESSES FOR THE PREPARATION OF TITANIUMPHTHALOCYANINE TYPE X

BACKGROUND OF THE INVENTION

This invention is generally directed to titanyl phthalocyanines and processes for the preparation thereof, and more specifically the present invention is directed to processes for obtaining titanyl phthalocyanine polymorphs or crystal forms, including Type X, and layered photoconductive members comprised of the aforementioned titanyl phthalocyanine polymorphs. In one embodiment, the present invention is directed to a process for the preparation of stable Type X titanyl phthalocyanine by the treatment thereof with an organic solvent, such as fluorobenzene. In one embodiment, the process of the present invention comprises the treatment or washing of Type X titanyl phthalocyanine, the preparation of which is disclosed, for example, in the copending patent applications mentioned herein, with fluorobenzene, thereby providing a stable Type X that does not reconvert to Type IV, or Type II titanyl phthalocyanine, and wherein an imaging member with the Type X possesses improved photosensitivity. In an embodiment, the process of the present invention comprises the reaction of titanium tetra(alkoxide) with diiminoisoindolene in a solvent such as chloronaphthalene; dissolving the resulting pigment in a solvent mixture of trifluoroacetic acid and methylene chloride; and thereafter precipitating the desired titanyl phthalocyanine polymorph by, for example, adding with stirring the aforementioned mixture to a mixture of methanol and water, separating the product therefrom by, for example, filtration, and washing the product obtained with fluorobenzene. The titanyl phthalocyanines, especially the X form, can be selected as an organic photogenerator pigment in photoresponsive imaging members containing charge, especially hole transport layers such as aryl amine hole transport molecules. The aforementioned photoresponsive imaging members can be negatively charged when the photogenerating layer is situated between the hole transport layer and the substrate, or positively charged when the hole transport layer is situated between the photogenerating layer and the supporting substrate. The layered photoconductor imaging members can be selected for a number of different known imaging and printing processes including, for example, electrophotographic imaging processes, especially xerographic imaging and printing processes wherein negatively charged or positively charged images are rendered visible with toner compositions of the appropriate charge. Generally, the imaging members are sensitive in the wavelength regions of from about 700 to about 850 nanometers, thus diode lasers can be selected as the light source.

Certain titanium phthalocyanine pigments have been known, reference for example the publication WW 2(PB 85172 Fiat Final Report 1313, Feb. 1, 1948). However, unlike other phthalocyanines such as metal-free, copper, iron and zinc phthalocyanines, titanium phthalocyanines have had minimum commercial use. Titanyl phthalocyanines or oxytitanium phthalocyanines are known to absorb near-infrared light around 800 nanometers and a number of such pigments have been illustrated in the prior art as materials for IR laser optical recording material, reference for example BASF German 3,643,770 and U.S. Pat. No. 4,458,004. The use of certain titanium phthalocyanine pigments as a photoconductive material for electrophotographic applications is known, reference for example British Patent Publication 1,152,655, the disclosure of which is totally incorporated herein by reference. Also, U.S. Pat. No. 3,825,422 illustrates the use of titanyl phthalocyanine as a photoconductive pigment in an electrophotographic process known as particle electrophoresis. Additionally, the utilization of certain titanyl phthalocyanines and substituted derivatives thereof in a dual layer electrographic device is illustrated in EPO 180931, May 14, 1986. Moreover, the use of tetra- and hexadeca-fluoro-substituted titanyl phthalocyanine in an electrophotographic device is illustrated in U.S. Pat. No. 4,701,396. In Japanese Patent Publication 64-171771, August, 1986, there is illustrated the use of titanyl phthalocyanine, which has been treated with a hot solvent, in electrophotography. Further, in German 3,821,628 there is illustrated the utilization of certain titanyl phthalocyanines, and other pigments in electrophotography, and wherein the titanyl phthalocyanines have been purified primarily to reduce the level of ash, volatile contaminants and sodium to below specified levels.

In Japanese 62-256865 there is disclosed, for example, a process for the preparation of pure Type I involving the addition of titanium tetrachloride to a solution of phthalonitrile in an organic solvent which has been heated in advance to a temperature of from 160° to 300° C. In Japanese 62-256866, there is illustrated, for example, a method of preparing the aforementioned polymorph which involves the rapid heating of a mixture of phthalonitrile and titanium tetrachloride in an organic solvent at a temperature of from 100° to 170° C. over a time period which does not exceed one hour. In Japanese 62-256867, there is described, for example, a process for the preparation of pure Type II (B) titanyl phthalocyanine, which involves a similar method to the latter except that the time to heat the mixture at from 100° to 170° C., is maintained for at least two and one half hours. Types I and II, in the pure form obtained by the process of the above publications, apparently afforded layered photoresponsive imaging members with excellent electrophotographic characteristics.

In Mita EPO Patent Publication 314,100, there is illustrated the synthesis of TiOPc by, for example, the reaction of titanium alkoxides and diiminoisoindolene in quinoline or an alkylbenzene, and the subsequent conversion thereof to an alpha Type pigment (Type II) by an acid pasting process, whereby the synthesized pigment is dissolved in concentrated sulfuric acid, and the resultant solution is poured onto ice to precipitate the alpha-form, which is filtered and washed with methylene chloride. This pigment, which was blended with varying amounts of metal free phthalocyanine, could be selected as the electric charge generating layer in layered photoresponsive imaging members with a high photosensivity at, for example, 780 nanometers.

Figure 1A:
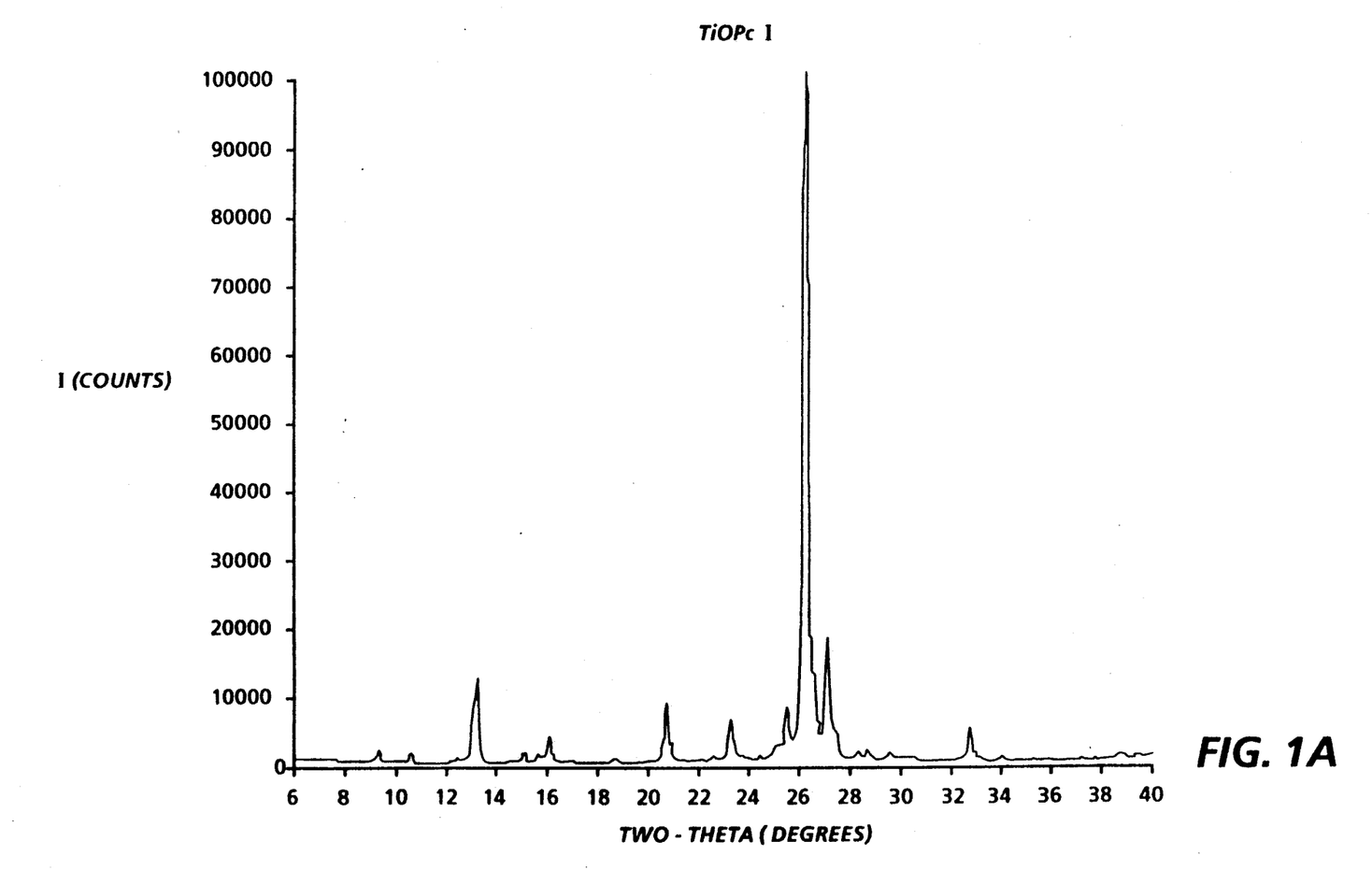
FIGS. 1A, 1B, 1C, 1D and 1E are diffractograph summaries of the XRPDs of the known polymorphs, Type I, II, III, IV, and X of titanyl phthalocyanine.
Figure 1B:
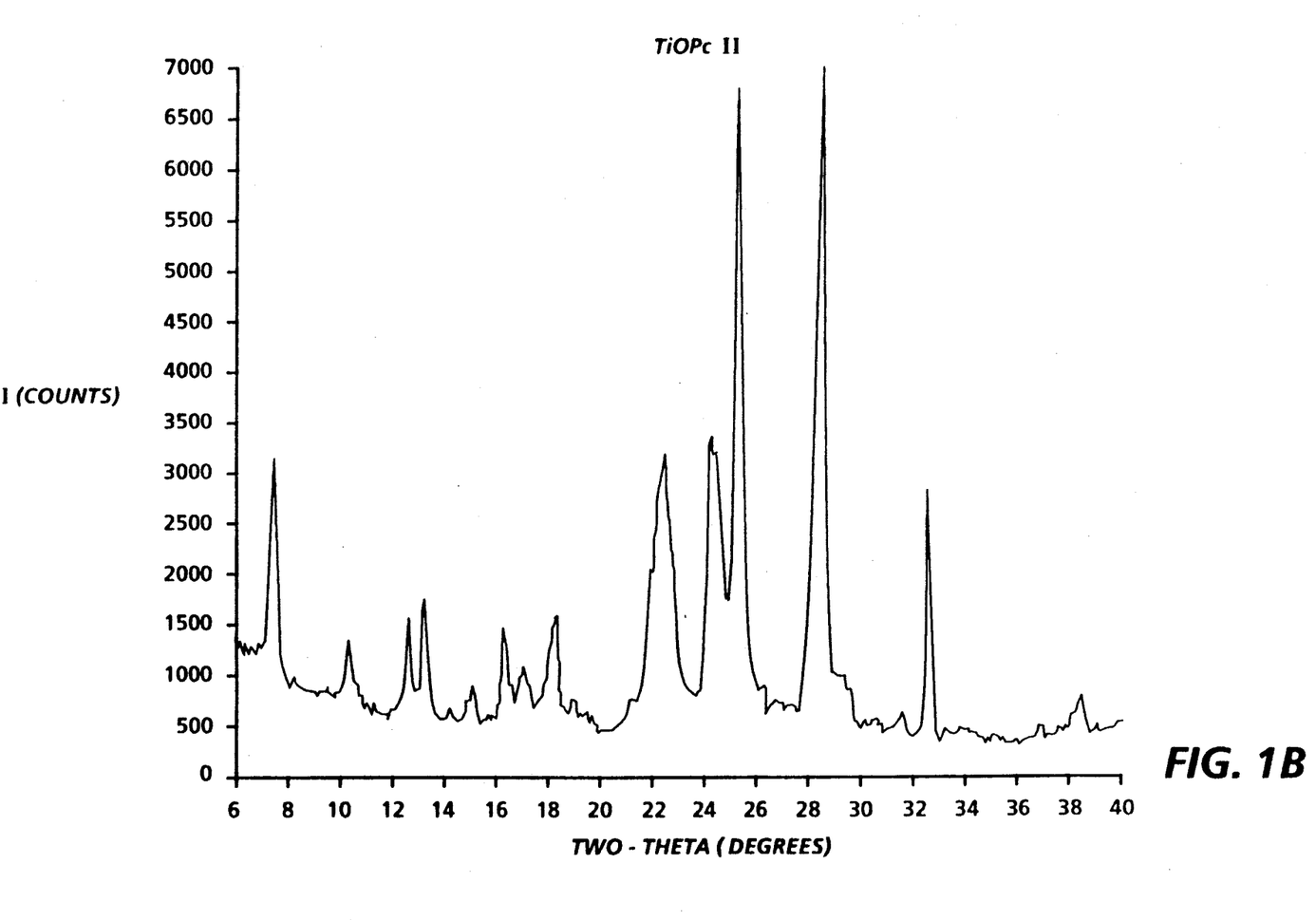
Figure 1C:
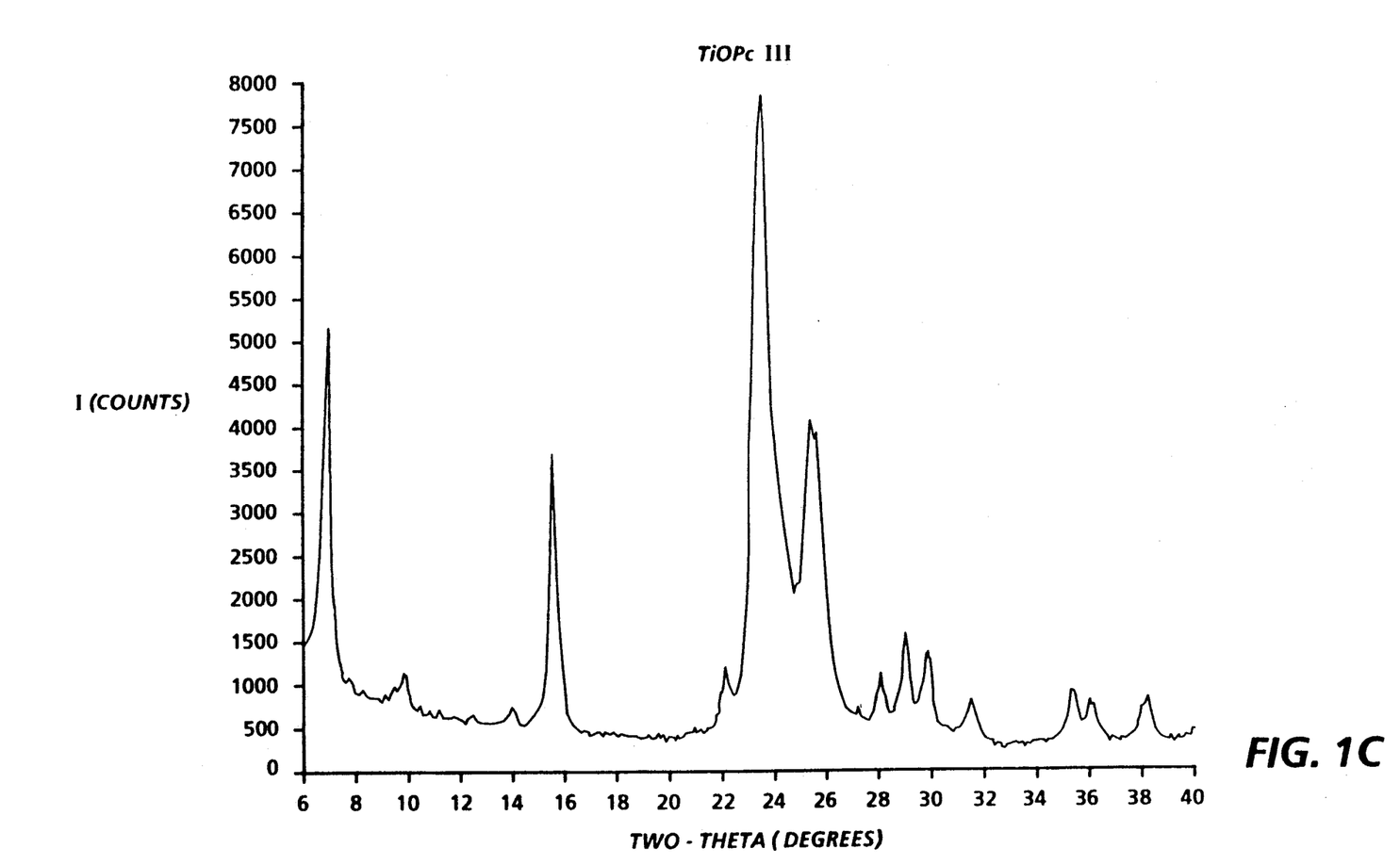
Figure 1D:
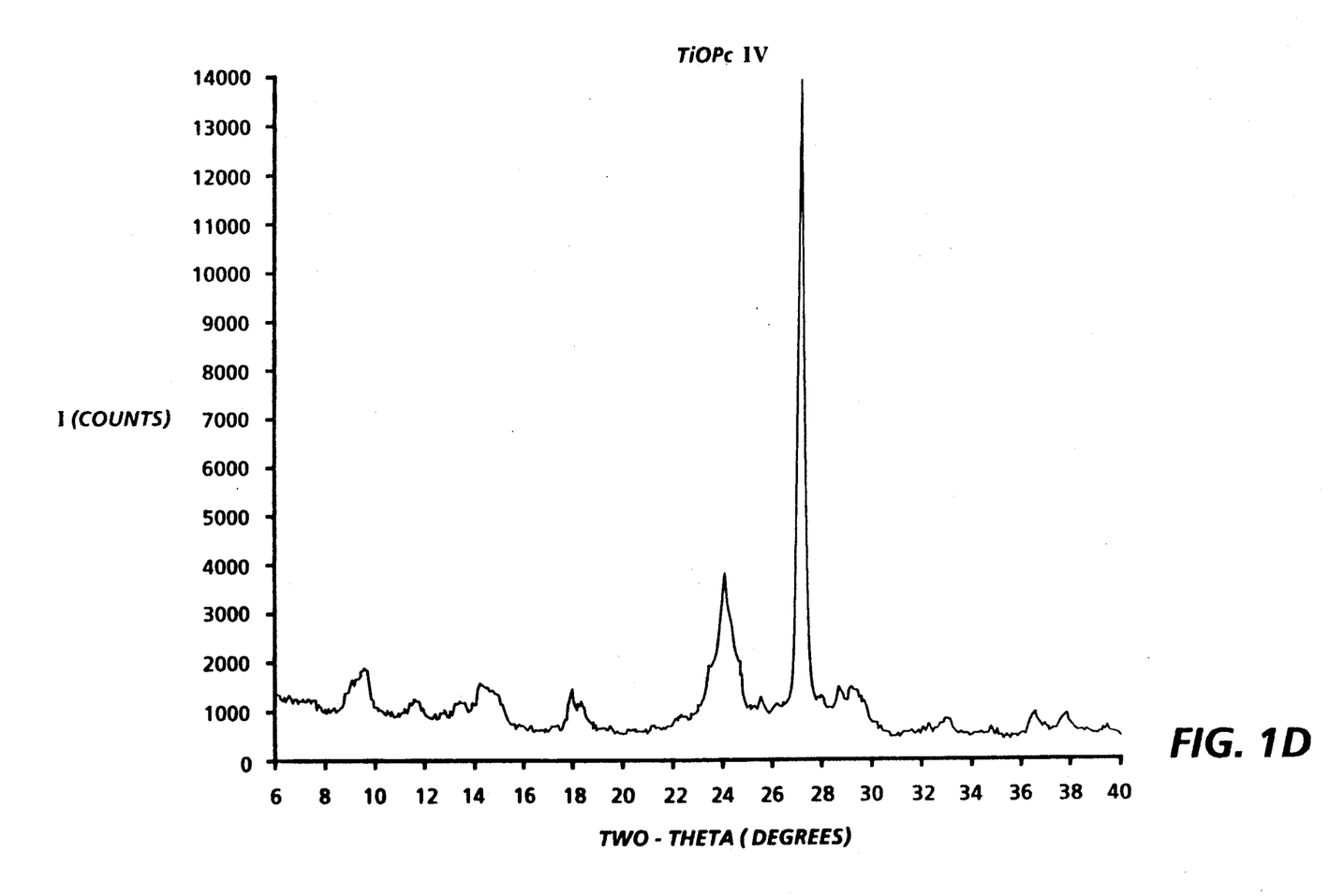
Figure 1E:
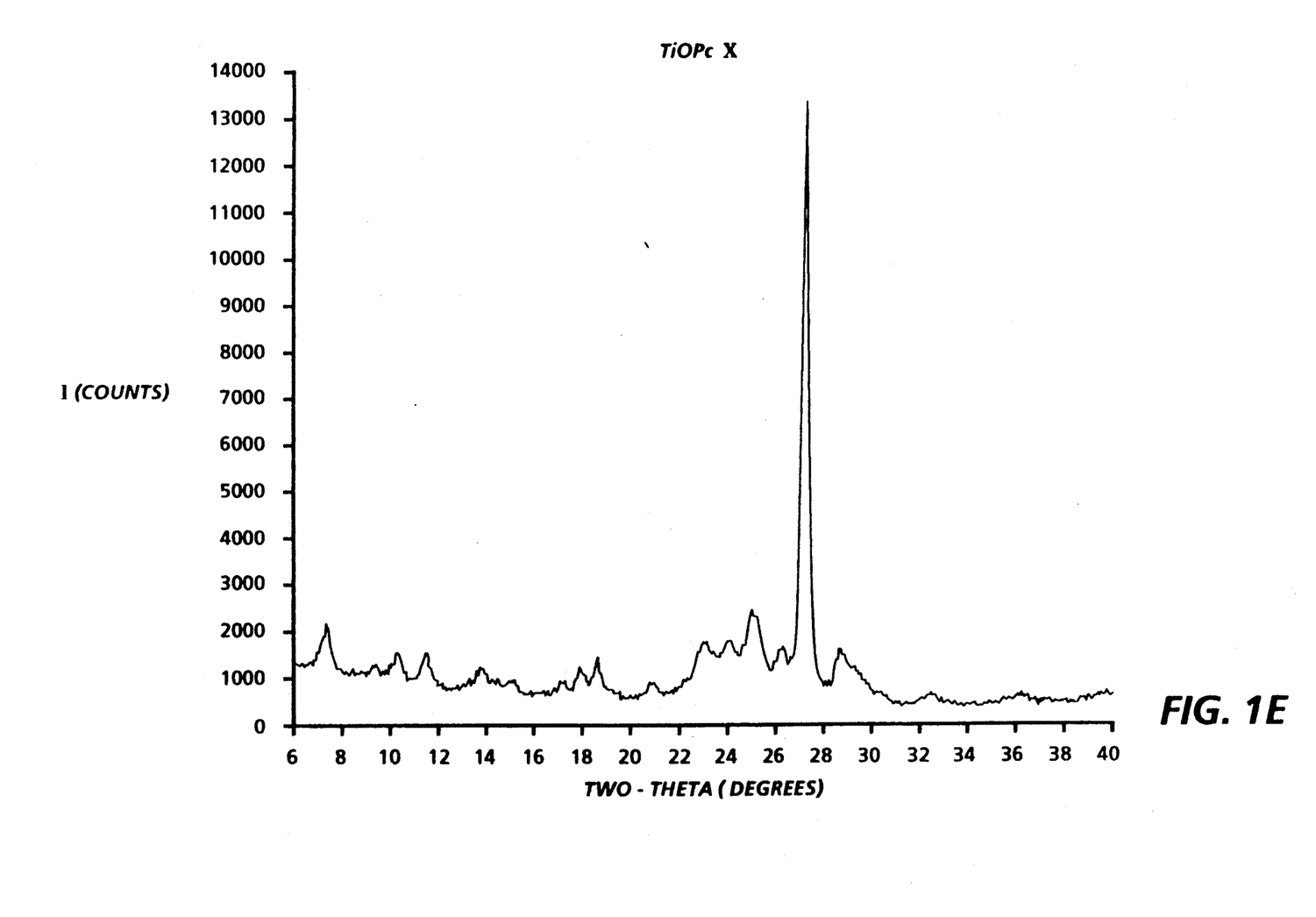
Figure 2:
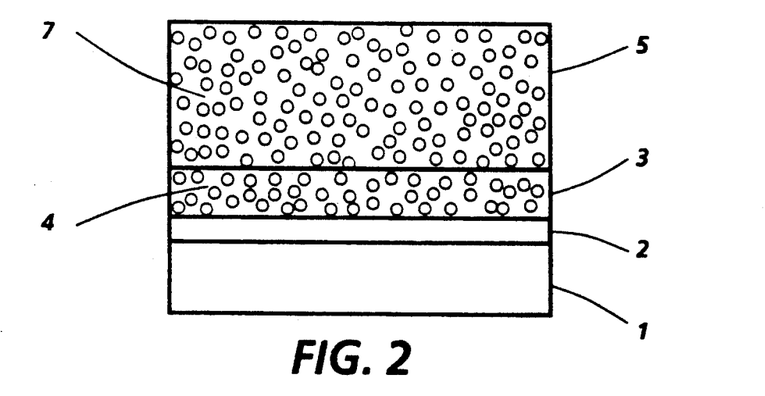
Figure 3:
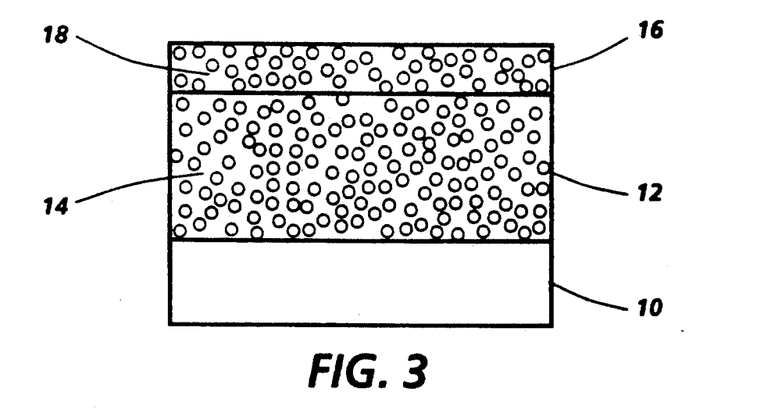

In the aforementioned documents, certain synthesis and processing conditions are disclosed for the preparation of the titanyl phthalocyanine pigments. As mentioned in the textbook *Phthalocyanine Compounds* by Moser and Thomas, the disclosure of which is totally incorporated herein by reference, polymorphism or the ability to form distinct solid state forms is well known in phthalocyanines. For example, metal-free phthalocyanine is known to exist in at least 5 forms designated as alpha, beta, pi, X and tau. Copper phthalocyanine crystal forms known as alpha, beta, gamma, delta, epsilon and pi are also described. These different polymorphic forms are usually distinguishable on the basis of differences in the solid state properties of the materials which can be determined by measurements, such as Differential Scanning Calorimetry, Infrared Spectroscopy, Ultraviolet-Visible-Near Infrared spectroscopy and, especially, X-Ray Powder Diffraction techniques. There appears to be general agreement on the nomenclature used to designate specific polymorphs of commonly used pigments such as metal-free and copper phthalocyanine. However, this does not appear to be the situation with titanyl phthalocyanines as different nomenclature is selected in a number of instances. For example, reference is made to alpha, beta, A,B, C, y, and m forms of TiOPc (titanyl phthalocyanine) with different names being used for the same form in some situation. It is believed that five main crystal forms of TiOPc are known, that is Types X, I, II, III, and IV. X-ray powder diffraction traces (XRPDs) obtained from these 5 forms are shown in FIGS. 1A, 1B, 1C, 1D, and 1E. Subclasses of these forms with broad, more poorly resolved peaks than those shown in FIGS. 1A, 1B, 1C and 1D can be envisioned, however, the basic features of the diffractograms indicate the major peaks in the same position although the smaller peaks can be unresolved. This broadening of XRPD peaks is generally found in pigments having a very small particle size. In Table 1 that follows, there is provided a listing of documents that disclose titanyl phthalocyanine polymorpic forms classified as belonging to one of the main types as indicated.

TABLE 1

| Crystal Form | Other Names | Documents |
|---|---|---|
| Type I | β | Toyo Ink Electrophotog. (Japan) 27,533 (1988) |
| | β | Dainippon US 4,728,592 |
| | β | Sanyo-Shikiso JOP 63-20365 |
| | A | Mitsubishi JOP 62-25685, -6, -7 Conference Proceedings |
| | A | Konica "Japan Hardcopy 1989", 103, (1989) |
| Type II | α | Toyo Ink "Electrophoto (Japan)" 27,533 (1988) |
| | α | Sanyo-Shikiso JOP 63-20365 |
| | α | Konica US 4,898,799 |
| | α | Dainippon US 4,728,592 |
| | α | Mita EU 314,100 |
| | B | Mitsubishi JOP 62-25685, -6, -7 |
| | B | Konica "Japan Hardcopy 1989, 103, (1989) |
| Type III | C | Mtsubishi OP 62-25685, -6, -7 |
| | C | Konica "Japan Hardcopy 1989, 103, (1989) |
| | m | Toyo Ink "Electrophoto (Japan)" 27,533 (1988) |
| Type IV | y | Konica "Japan Hardcopy 1989", 103, (1989) |
| | Un-named | Konica US 4,898,799 |
| | New Type | Sanyo-Shikiso JOP 63-20365 |

More specifically, the aforementioned documents illustrate, for example, the use of specific polymorphs of TiOPc in electrophotographic devices. Three crystal forms of titanyl phthalocyanine, differentiated by their XRPDs, were specifically illustrated, identified as A, B, and C, which it is believed are equivalent to Types I, II, and III, respectively.

In Sanyo-Shikiso Japanese 63-20365/86, reference is made to the known crystal forms alpha and beta TiOPc (Types II and I, respectively, it is believed), which publication also describes a process for the preparation of a new form of titanyl phthalocyanine. This publication appears to suggest the use of the unnamed titanyl phthalocyanine as a pigment and its use as a recording medium for optical discs. This apparently new form was prepared by treating acid pasted TiOPc (Type II form, it is believed) with a mixture of chlorobenzene and water at about 50° C. The resulting apparently new form is distinguished on the basis of its XRPD, which appears to be identical to that shown in FIG. 1 for the Type IV polymorph.

In U.S. Pat. No. 4,728,592, there is illustrated, for example, the use of alpha type TiOPc (Type II) in an electrophotographic device having sensitivity over a broad wavelength range of from 500 to 900 nanometers. This form was prepared by the treatment of dichlorotitanium phthalocyanine with concentrated aqueous ammonia and pyridine at reflux for 1 hour. Also described in the aforementioned patent is a beta Type TiOPc (Type I) as a pigment, which is believed to provide a much poorer quality photoreceptor.

In Konica Japanese 64-17066/89, there is disclosed, for example, the use of a new crystal modification of TiOPc prepared from alpha type pigment (Type II) by milling it in a sand mill with salt and polyethylene glycol. This pigment has a strong XRPD peak at a value of 2 theta of 27.3 degrees. This publication also discloses that this new form differs from alpha type pigment (Type II) in its light absorption and shows a maximum absorbance at 817 nanometers compared to alpha-type, which has a maximum at 830 nanometers. The XRPD shown in the publication for this new form is believed to be identical to that of the Type IV form previously described by Sanyo-Shikiso in JOP 63-20365. The aforementioned Konica publication also discloses the use of this new form of TiOPc in a layered electrophotographic device having high sensitivity to near infrared light of 780 nanometers. The new form is indicated to be superior in this application to alpha type TiOPc (Type II). Further, this new form is also described in U.S. Pat. No. 4,898,799 and in a paper presented at the Annual Conference of Japan Hardcopy in July 1989. In this paper, this same new form is referred to as Type y, and reference is also made to Types I, II, and III as A, B, and C, respectively.

In the journal, Electrophotography (Japan) vol. 27, pages 533 to 538, Toyo Ink Manufacturing Company, there are disclosed, for example, alpha and beta forms of TiOPc (Types I and II, it is believed) and also this journal discloses the preparation of a Type m TiOPc, an apparently new form having an XRPD pattern which was distinct from other crystal forms. It is believed that his XRPD is similar to that for the Type III titanyl phthalocyanine pigment but it is broadened most likely as the particle size is much smaller than that usually found in the Type III pigment. This pigment was used to prepare photoreceptor devices having greater sensitivity at 830 nanometers than alpha or beta Type TiOPc (Type II or I, respectively).

Processes for the preparation of specific polymorphs of titanyl phthalocyanine, which require the use of a strong acid such as sulfuric acid, are known, and these processes, it is believed, are not easily scalable. One process as illustrated in Konica Japanese Laid Open on Jan. 20, 1989 as 64-17066 (U.S. Pat. No. 4,898,799 appears to be its equivalent), the disclosure of which is totally incorporated herein by reference, involves, for example, the reaction of titanium tetrachloride and phthalodinitrile in 1-chloronaphthalene solvent to produce dichlorotitanium phthalocyanine which is then subjected to hydrolysis by ammonia water to enable the Type II polymorph. This phthalocyanine is preferably treated with an electron releasing solvent such as 2-ethoxyethanol, dioxane, N-methylpyrrolidone, followed by subjecting the alpha-titanyl phthalocyanine to milling at a temperature of from 50° to 180° C. In a second method described in the aforementioned Japanese Publication, there is disclosed the preparation of alpha type titanyl phthalocyanine with sulfuric acid. Another method for the preparation of Type IV titanyl phthalocyanine involves the addition of an aromatic hydrocarbon, such as chlorobenzene solvent, to an aqueous suspension of Type II titanyl phthalocyanine prepared by the well-known acid pasting process, and heating the resultant suspension to about 50° C. as disclosed in Sanyo-Shikiso Japanese 63-20365, Laid Open in Jan. 28, 1988. In Japanese 171771/1986, Laid Open Aug. 2, 1986, there is disclosed the purification of metallophthalocyanine by treatment with N-methylpyrrolidone.

To obtain a TiOPc-based photoreceptor having high sensitivity to near infrared light, it is believed necessary to control not only the purity and chemical structure of the pigment, as is generally the situation with organic photoconductors, but also to prepare the pigment in the correct crystal modification. The disclosed processes used to prepare specific crystal forms of TiOPc, such as Types I, II, III and IV, are either complicated and difficult to control as in the preparation of pure Types I and II pigment by careful control of the synthesis parameters by the processes described in Mitsubishi Japanese 62-25685, -6 and -7, or involve harsh treatment such as sand milling at high temperature, reference Konica U.S. Pat. No. 4,898,799; or dissolution of the pigment in a large volume of concentrated sulfuric acid, a solvent which is known to cause decomposition of metal phthalocyanines, reference Sanyo-Shikiso Japanese 63-20365 and Mita EPO 314,100.

Generally, layered photoresponsive imaging members are described in a number of U.S. patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

In a copending application U.S. Ser. No. 537,714 filed Jun. 14, 1990, the disclosure of which is totally incorporated herein by reference, there are illustrated photoresponsive imaging members with photogenerating titanyl phthalocyanine layers prepared by vacuum deposition. It is indicated in this copending application that the imaging members comprised of the vacuum deposited titanyl phthalocyanines and aryl amine hole transporting compounds exhibit superior xerographic performance as low dark decay characteristics result and higher photosensitivity is generated, particularly in comparison to several prior art imaging members prepared by solution coating or spray coating, reference for example, U.S. Pat. No. 4,429,029 mentioned hereinbefore.

In copending application U.S. Ser. No. 533,265 filed Jun. 4, 1990, the disclosure of which is totally incorporated herein by reference, there is illustrated a process for the preparation of phthalocyanine composites which comprises adding a metal free phthalocyanine, a metal phthalocyanine, a metalloxy phthalocyanine or mixtures thereof to a solution of trifluoroacetic acid and a monohaloalkane; adding to the resulting mixture a titanyl phthalocyanine; adding the resulting solution to a mixture that will enable precipitation of said composite; and recovering the phthalocyanine composite precipitated product.

In copending applications U.S. Ser. No. 683,935 filed Apr. 11, 1991 there is disclosed a process for the preparation of titanyl phthalocyanine which comprises the treatment of titanyl phthalocyanine Type X with a halobenzene; U.S. Ser. No. 678,506 filed Apr. 1, 1991 discloses a process for the preparation of titanyl phthalocyanine which comprises the reaction of a titanium tetraalkoxide and diiminoisoindolene in the presence of a halonaphthalene solvent; dissolving the resulting Type I titanyl phthalocyanine in a haloacetic acid and an alkylene halide; adding the resulting mixture slowly to a cold alcohol solution; and thereafter isolating the resulting Type X titanyl phthalocyanine with an average volume particle size diameter of from about 0.02 to about 0.5 micron; and Ser. No. 683,901 filed Apr. 11, 1991 discloses a process for the preparation of titanyl phthalocyanine Type I which comprises the reaction of titanium tetraalkoxide and diiminoisoindolene in the presence of a halonaphthalene solvent. The disclosures of each of the aforementioned copending patent applications are totally incorporated herein by reference.

SUMMARY OF THE INVENTION

It is a feature of the present invention to provide processes for the preparation of titanyl phthalocyanines with many of the advantages illustrated herein.

It is yet another feature of the present invention to provide economically scalable processes for the preparation of Type X titanyl phthalocyanines.

Another feature of the present invention relates to the preparation of stable titanyl phthalocyanine Type X polymorphs.

Further, another feature of the present invention relates to the preparation of photogenerating titanyl phthalocyanines Type X by the solubilization of titanyl phthalocyanine Type I followed by the reprecipitation into solvent compositions and washing with an organic solvent, for example fluorobenzene.

Moreover, another feature of the present invention relates to the preparation of stable titanyl phthalocyanine Type X with high purities, for example exceeding about 99 percent, by the treatment thereof with fluorobenzene, and the use thereof in electrophotographic imaging processes.

Yet another feature of the present invention is the provision of processes that affords a Type X crystal form of TiOPc with improved photosensitivity when selected as a photogenerator in a layered imaging member.

Another feature of the present invention in an embodiment thereof resides in the preparation of TiOPc Type X polymorphs having a small particle size of about 0.1 micron which is advantageous for the preparation of electrophotographic devices since, for example, the prepared polymorphs can be easily dispersed in coating compositions.

Yet another feature of the present invention is that mild conversion conditions can be selected, which do not cause decomposition of the titanyl phthalocyanine pigment.

A further feature of the present invention resides in the provision of photoresponsive imaging members with an aryl amine hole transport layer, and a photogenerator layer comprised of titanyl phthalocyanine pigment Type X obtained by the processes illustrated herein.

These and other features of the present invention are accomplished in embodiments thereof by the provision of processes for the preparation of titanyl phthalocyanines and photoresponsive imaging members thereof. More specifically, in one embodiment of the present invention there are provided processes for the preparation of titanyl phthalocyanine (TiOPc) Type X polymorphs which comprises the solubilization of a titanyl phthalocyanine Type I, which can be obtained by the reaction of DI[3] and titanium tetrabutoxide in the presence of a solvent, such as chloronaphthalene, reference copending application U.S. Ser. No. 678,506 filed Apr. 1, 1991 the disclosure of which is totally incorporated herein by reference, in a mixture of trifluoroacetic acid and methylene chloride, precipitation of the desired titanyl phthalocyanine Type X, separation by, for example, filtration, and thereafter subjecting the product to washing with fluorobenzene. The product can be identified by various known means including X-ray powder diffraction (XRPD).

One embodiment of the present invention is directed to processes for the preparation of titanyl phthalocyanine Type X, which comprise the reaction of titanium tetrapropoxide with diiminoisoindolene in N-methylpyrrolidone solvent to provide Type I titanyl phthalocyanine as determined by X-ray powder diffraction; dissolving the resulting titanyl phthalocyanine in a mixture of trifluoroacetic acid and methylene chloride; adding the resulting mixture to a stirred organic solvent, such as methanol, water or mixtures thereof; separating the resulting precipitate of Type X by, for example, vacuum filtration through a glass fiber paper in a Buchner funnel; washing the obtained Type X pigment with an organic solvent, such as an aliphatic alcohol, with from about 1 to about 10 carbon atoms, like methanol; washing with water and then treating the titanyl phthalocyanine Type X product obtained with fluorobenzene.

Examples of titanyl phthalocyanine reactants that can be selected for the processes of the present invention in effective amounts of, for example, from about 1 weight percent to about 40 percent by weight of the trifluoroacetic acidic solvent mixture include known available titanyl phthalocyanines; titanyl phthalocyanines synthesized from the reaction of titanium halides such as titanium trichloride, titanium tetrachloride or tetrabromide; titanium tetraalkoxides such as titanium tetramethoxide, -ethoxide, -propoxide, -butoxide, -isopropoxide and the like; and other titanium salts. These materials can be reacted with, for example, phthalonitrile and diiminoisoindolene in solvents such as 1-chloronaphthalene, quinoline, N-methylpyrrolidone, and alkylbenzenes such as xylene at temperatures of from about 120° to about 300° C. to provide Type I titanyl phthalocyanine.

As the solvent mixture for the Type I titanyl phthalocyanine, obtained as illustrated herein or obtained from other sources, there can be selected a strong organic acid, such as a trihaloacetic acids, including trifluoroacetic acid or trichloroacetic acid, and a cosolvent, such as an alkylene halide, such as methylene chloride, chloroform, trichloroethylene, bromoform and other short chain halogenated alkanes and alkenes with from 1 to about 6 carbon atoms and from 1 to about 6 halogen atoms including chlorofluorocarbons and hydrochlorofluorocarbons; haloaromatic compounds such as chlorobenzene, dichlorobenzene, chloronaphthalene, fluorobenzene, bromobenzene, and benzene; alkylbenzenes such as toluene and xylene; and other organic solvents which are miscible with strong organic acids and which will effectively dissolve the titanyl phthalocyanine in effective amounts of, for example, a ratio of from about 1 to 50 parts of acid to about 50 parts of cosolvent such as methylene chloride. In an embodiment of the present invention, a preferred solvent mixture is comprised of trifluoroacetic acid and methylene chloride in a ratio of from about 5 parts of acid to about 95 parts of methylene chloride to 25 parts of acid to 75 parts of methylene chloride.

Subsequent to solubilization with the above solvent mixture and stirring for an effective period of time of, for example, from about 5 minutes to about two weeks, the resulting mixture is added to a solvent that will enable precipitation of the desired titanyl phthalocyanine polymorph, such as Type X, which solvent is comprised of an alcohol such as an alkylalcohol including methanol, ethanol, propanol, isopropanol, butanol, n-butanol, pentanol and the like; ethers such as diethyl ether and tetrahydrofuran; hydrocarbons such as pentane, hexane and the like with, for example, from about 4 to about 10 carbon atoms; aromatic solvents such as benzene, toluene, xylene, halobenzenes such as chlorobenzene, and the like; carbonyl compounds such as ketones such as acetone, methyl ethyl ketone, and butyraldehyde; glycols such as ethylene and propylene glycol and glycerol; polar aprotic solvents such as dimethyl sulfoxide, dimethylformamide and N-methylpyrrolidone; water and mixtures thereof; followed by filtration of the titanyl phthalocyanine polymorph Type X, and washing with various solvents such as, for example, deionized water and an alcohol such as methanol and the like, which serves to remove residual acid and any impurities which might have been released by the process of dissolving and reprecipitating the pigment. The solid resulting can then be dried by, for example, heating yielding a dark blue pigment of the desired titanyl phthalocyanine Type X polymorph, as determined by XRPD analysis. The Type X obtained is then washed with fluorobenzene, and the stable product Type X with excellent photosensitivity separated therefrom by, for example, filtration.

In an embodiment of the present invention, there is provided a process for the preparation of titanyl phthalocyanine polymorph Type X, which comprises: 1) dissolving the precursor pigment, Type I titanyl phthalocyanine, in a mixture of trifluoroacetic acid and methylene chloride comprised of from 5 percent acid to about 25 percent acid and 95 parts to 75 parts of methylene chloride, wherein the amount of precursor pigment is, for example, from 5 parts to about 25 parts of the precursor pigment to 100 parts of acid solution by adding the pigment to the solution and stirring the mixture for an effective period of time, for example from about 5 minutes to about four weeks, and in an embodiment about two weeks, at a temperature of from about 0° to about 50° C.; 2) pouring or adding the resultant solution into a rapidly stirred precipitant solvent in a ratio of from about 1 part of the aforementioned pigment solution to 2 parts of precipitant solution to about 1 part pigment solution to about 50 parts of precipitant at a temperature of from about 0° to about 100° C. over a period of from 1 minute to about 60 minutes to ensure rapid efficient mixing in an embodiment, the precipitant solution was stirred at a rate sufficient to form a deep vortex in the reaction vessel, and the pigment was poured in a slow stream into the side of the vortex; 3) following the addition, the resultant dispersion of the polymorphic form Type X of TiOPc was stirred at a temperature of from 0° to about 100° C. for a period of from about 5 minutes to about 24 hours; 4) subsequently separating the titanyl phthalocyanine Type X from the mother liquor by filtration, for example through a glass fiber filter in a porcelain filter funnel, and washing the product titanyl phthalocyanine Type X pigment in the funnel with an effective amount of solvent, for example from about 20 parts of wash solvent to about 1 part of the starting pigment, such as methanol, to remove most of the acidic mother liquor; 5) redispersing the resulting wet cake in a solvent, such as methanol, acetone, water, and the like in an effective amount of, for example, from about 20 parts to about 100 parts of solvent to 1 part of the pigment for a period of from about 5 minutes to 24 hours at a temperature of from 0° C. to about 100° C., the primary purpose of such washing being to further remove any residual acid or other impurities from the Type X TiOPc which resulted from the precipitation process; 6) isolating the desired titanyl phthalocyanine polymorph Type X by, for example, filtration through a glass fiber filter as in step (4), and subsequently optionally washing the solid product in the funnel with a solvent, such as water methanol or acetone, and the like to complete purification. Subsequently, the Type X product is washed with fluorobenzene to provide Type X titanyl phthalocyanine having excellent xerographic characteristics, for example an $E_{\frac{1}{2}}$ equal to 1.1 ergs/cm$^2$, a dark decay of 23 to 25 volts/second, and a discharge at 5 and 10 ergs/cm$^2$ of 85 and 89 percent, respectively, when the aforementioned Type X was selected as a photogenerator in a layered imaging member, such as that of Example III. The final product can be obtained after the solid has been dried at a temperature of from about 25° to about 150° C. for a time of 1 hour to about 24 hours, for example either in the air or under vacuum. A yield corresponding to about 95 percent to about 75 percent of the weight of the starting pigment can be obtained. The polymorphic form of the final pigment was determined by XRPD analysis, and was determined to be Type X, and remained as Type X after two months as determined by XRPD analysis.

A typical small scale conversion reaction was accomplished in an embodiment of the present invention as follows:

Two grams of titanyl phthalocyanine Type I synthesized by the process of Example I, below, was dissolved in 20 milliliters of a 1:4 mixture (V/V) of trifluoroacetic acid in methylene chloride by stirring in a 25 milliliter Erlenmeyer flask at room temperature for 5 minutes. The resultant dark green solution, which did not contain any undissolved material, was then poured into 200 milliliters of methanol in a 250 milliliter Erlenmeyer flask with vigorous stirring at room temperature. The resultant dark blue suspension was stirred at room temperature for an additional 30 minutes and then was filtered through a 4.25 centimeter glass fiber filter (Whatman GF/A grade) and the solid was washed on the funnel with about 20 milliliters of methanol. The resultant wet filter cake was transferred to a 125 milliliter flask and was redispersed in 50 milliliters of methanol. The resulting dispersion was stirred for 30 minutes, then was refiltered as above, and the solid resulting was washed on the funnel with methanol (20 milliliters) then water (2×20 milliliters) and finally with methanol again (20 milliliters). Subsequently, the Type X titanyl phthalocyanine obtained was then washed with fluorobenzene as illustrated herein, and the Type X separated therefrom by, for example, filtration. The solid was dried at 70° C. for 2 hours to yield about 2 grams of dark blue pigment. The product was identified as Type X TiOPc on the basis of its XRPD trace.

In another embodiment of the present invention, solutions of TiOPc Type I in a 1:4 mixture of trifluoroacetic acid and methylene chloride were precipitated into varying mixtures of methanol and water as indicated in the Table that follows, followed by washing with fluorobenzene as illustrated herein. The titanyl phthalocyanine Type X products obtained were analyzed and identified by XRPD traces.

TABLE 2

| Precipitant Solvent Ratio MeOH/H$_2$O | XRPD Analysis |
|---|---|
| 100:0 | Type Z-1 |
| 95:5 | Type III (major) |
| 90:10 | Type III (major) |
| 85:15 | Type III (major) |
| 80:20 | Type III (major) |
| 75:25 | Type III (major) |
| 70:30 | Type III (major) |
| 65:35 | Type III (minor) + Type X |
| 60:40 | Type X |
| 55:45 | Type X |
| 50:50 | Type X |
| 45:55 | Type X |
| 40:60 | Type X |
| 35:65 | Type X |
| 30:70 | Type IV |
| 25:75 | Type IV |
| 20:80 | Type IV |
| 0:100 | Type IV |

The data in this Table illustrate that at relatively high methanol concentrations the preponderant polymorph formed is the Type III form. However, beginning at a composition of about 65 percent of methanol and 35 percent of water, the Type X form predominates. Polymorphically pure Type X can be obtained when the acid solution is precipitated into methanol/water compositions with, for example, from 60 to 35 percent of methanol. Compositions containing less than about 35 percent of methanol and pure water result in the formation of the Type IV form which has the XRPD peaks at 2 theta=9.8 degrees.

Another embodiment of the present invention is directed to a process for the preparation of titanyl phthalocyanine Type X, which comprises the reaction of diiminoisoindolene in a ratio of from 3 to 5 molar equivalents with 1 molar equivalent of titanium tetrapropoxide in chloronaphthalene or N-methylpyrrolidone solvent in a ratio of from about 1 part diiminoisoindolene to from about 5 to about 10 parts of solvent. These ingredients are stirred and warmed to a temperature of from about 160° to 240° C. for a period of from about 30 minutes to about 8 hours. The reaction mixture is then cooled to a temperature of from about 100° to 160° C., and the resulting mixture is filtered through a sintered glass funnel (M porosity). The pigment obtained is then washed in the funnel with boiling dimethyl formamide (DMF) solvent in an amount which is sufficient to remove all deeply colored impurities from the solid as evidenced by a change in the color of the filtrate from an initial black color to a faint blue green. Following this, the pigment is stirred in the funnel with boiling DMF in a sufficient quantity to form a loose suspension, which is refiltered. The solid is finally washed with DMF at room temperature, then with a small amount of methanol and is dried at about 70° C. for from about 2 to about 24 hours. Generally, an amount of DMF equal to the amount of solvent (chloronaphthalene or N-methylpyrrolidone) used in the synthesis reaction is required for the washing step. Thereafter, the Type I titanyl phthalocyanine pigment obtained is dissolved in trifluoroacetic acid and methylene chloride, re-precipitated in a methanol and water solution, washed with organic solvents such as methanol or water or the like, and the Type X obtained is then washed with fluorobenzene as illustrated herein. The yield from this synthesis is from 60 to about 80 percent. X-ray powder diffraction, XRPD, analysis of the product thus obtained indicated that it was the Type X polymorph of titanyl phthalocyanine.

Numerous different layered photoresponsive imaging members with the phthalocyanine pigments obtained by the processes of the present invention can be fabricated. In one embodiment, thus the layered photoresponsive imaging members can be comprised of a supporting substrate, a charge transport layer, especially an aryl amine hole transport layer, and situated therebetween a photogenerator layer comprised of titanyl phthalocyanine of Type X. Another embodiment of the present invention is directed to positively charged layered photoresponsive imaging members comprises of a supporting substrate, a charge transport layer, especially an aryl amine hole transport layer, and as a top overcoating titanyl phthalocyanine pigments Type X obtained with the processes of the present invention. Moreover, there is provided in accordance with the present invention an improved negatively charged photoresponsive imaging member comprised of a supporting substrate, a thin adhesive layer, a titanyl phthalocyanine obtained by the processes of the present invention photogenerator dispersed in a polymeric resinous binder, and as a top layer aryl amine hole transporting molecules dispersed in a polymeric resinous binder.

The photoresponsive imaging members of the present invention can be prepared by a number of known methods, the process parameters and the order of coating of the layers being dependent on the member desired. The imaging members suitable for positive charging can be prepared by reversing the order of deposition of photogenerator and hole transport layers. The photogenerating and charge transport layers of the imaging members can be coated as solutions or dispersions onto selective substrates by the use of a spray coater, dip coater, extrusion coater, roller coater, wire-bar coater, slot coater, doctor blade coater, gravure coater, and the like, and dried at from 40° to about 200° C. for from 10 minutes to several hours under stationary conditions or in an air flow. The coating is carried out in such a manner that the final coating thickness is from 0.01 to about 30 microns after it has dried. The fabrication conditions for a given layer will be tailored to achieve optimum performance and cost in the final device.

Imaging members with the titanyl phthalocyanine pigments of the present invention are useful in various electrostatographic imaging and printing systems, particularly those conventionally known as xerographic processes. Specifically, the imaging members of the present invention are useful in xerographic imaging processes wherein the titanyl phthalocyanines pigments absorb light of a wavelength of from about 600 nanometers to about 900 nanometers. In these known processes, electrostatic latent images are initially formed on the imaging member followed by development, and thereafter transferring the image to a suitable substrate.

Moreover, the imaging members of the present invention can be selected for electronic printing processes with gallium arsenide light emitting diode (LED) arrays which typically function at wavelengths of from 660 to about 830 nanometers.

BRIEF DESCRIPTION OF THE DRAWINGS

For a better understanding of the present invention and further features thereof, reference is made to the following detailed description of various preferred embodiments wherein:

FIG. 5 is a partially schematic cross-sectional view of a negatively charged photoresponsive imaging member of the present invention; and FIG. 6 is a partially schematic cross-sectional view of a positively charged photoresponsive imaging member of the present invention.

DESCRIPTION OF EMBODIMENTS

Illustrated in FIG. 5 is a negatively charged photoresponsive imaging member of the present invention comprised of a supporting substrate 1, a solution coated adhesive layer 2 comprised, for example, of a polyester 49,000 available from Goodyear Chemical, a photogenerator layer 3 comprised of titanyl phthalocyanine Type X, obtained with the process of the present invention, optionally dispersed in an inactive resinous binder, and a charge transport layer 5 comprised of N,N'-diphenyl-N,N'-bis(3-methyl phenyl)-1,1'-biphenyl-4,4'-diamine, dispersed in a polycarbonate resinous binder 7.

Illustrated in FIG. 6 is a positively charged photoresponsive imaging member of the present invention comprised of a substrate 10, a charge transport layer 12 comprised of N,N'-diphenyl-N,N'-bis(3-methyl phenyl)-1,1'-biphenyl-4,4'-diamine dispersed in a polycarbonate resinous binder 14, and a photogenerator layer titanyl phthalocyanine Type X, 16 obtained with the process of the present invention, optionally dispersed in an inactive resinous binder 18.

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR ® a commercially available polymer, MYLAR ® containing titanium, a layer of an organic or inorganic material having a semiconductive surface layer such as indium tin oxide or aluminum arranged thereon, or a conductive material inclusive of aluminum, chromium, nickel, brass or the like. The substrate may be flexible, seamless, or rigid and many have a number of many different configurations, such as for example a plate, a cylindrical drum, a scroll, an endless flexible belt and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKROLON®.

The thickness of the substrate layer depends on many factors, including economical considerations, thus this layer may be of substantial thickness, for example over 3,000 microns, or of minimum thickness providing there are no adverse effects on the system. In one embodiment, the thickness of this layer is from about 75 microns to about 300 microns.

With further regard to the imaging members, the photogenerator layer is preferably comprised of the titanyl phthalocyanine pigments Type X obtained with the processes of the present invention dispersed in resinous binders. Generally, the thickness of the photogenerator layer depends on a number of factors, including the thicknesses of the other layers and the amount of photogenerator material contained in this layer. Accordingly, this layer can be of a thickness of from about 0.05 micron to about 10 microns when the titanyl phthalocyanine photogenerator composition is present in an amount of from about 5 percent to about 100 percent by volume. In one embodiment, this layer is of a thickness of from about 0.25 micron to about 1 micron when the photogenerator composition is present in this layer in an amount of 30 to 75 percent by volume. The maximum thickness of this layer in an embodiment is dependent primarily upon factors, such as photosensitivity, electrical properties and mechanical considerations. The charge generator layer can be obtained by dispersion coating the TiOPc obtained with the processes of the present invention, and a binder resin with a suitable solvent. The binder may be omitted. The dispersion can be prepared by mixing and/or milling the TiOPc in equipment such as paint shakers, ball mills, sand mills and attritors. Common grinding media such as glass beads, steel balls or ceramic beads may be used in this equipment. A binder resin may be selected from a wide number of polymers such as poly(vinyl butyral), poly(vinyl carbazole), polyesters, polycarbonates, poly(vinyl chloride), polyacrylates and methacrylates, copolymers of vinyl chloride and vinyl acetate, phenoxy resins, polyurethanes, poly(vinyl alcohol), polyacrylonitrile, polystyrene, and the like. The solvents to dissolve these binders depend upon the particular resin. In embodiments of the present invention, it is desirable to select solvents that do not effect the other coated layers of the device. Examples of solvents useful for coating TiOPc dispersions to form a photogenerator layer are ketones, alcohols, aromatic hydrocarbons, halogenated aliphatic hydrocarbons, ethers, amines, amides, esters, and the like. Specific examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethylformamide, dimethylacetamide, butyl acetate, ethyl acetate, methoxyethyl acetate, and the like.

The coating of the TiOPc dispersion in embodiments of the present invention can be accomplished with spray, dip or wire bar methods such that the final dry thickness of the charge generator layer is from 0.01 to 30 microns and preferably from 0.1 to 15 microns after being dried at 40° to 150° C. for 5 to 90 minutes.

Also, illustrative examples of polymeric binder resinous materials that can be selected for the photogenerator pigment include those polymers as disclosed in U.S. Pat. No. 3,121,006, the disclosure of which is totally incorporated herein by reference.

As adhesives, there can be selected various known substances inclusive of polyesters, polyamides, poly(vinyl butyral), poly(vinyl alcohol), polyurethane and polyacrylonitrile. This layer is of a thickness of from about 0.05 micron to 1 micron. Optionally, this layer may contain conductive and nonconductive particles such as zinc oxide, titanium dioxide, silicon nitride, carbon black, and the like to provide, for example, in embodiments of the present invention desirable electrical and optical properties.

Aryl amines selected for the charge transporting layer which generally is of a thickness of from about 5 microns to about 75 microns, and preferably of a thickness of from about 10 microns to about 40 microns, include molecules of the following formula:

dispersed in a highly insulating and transparent organic resinous binder wherein X is an alkyl group or a halogen, especially those substituents selected from the group consisting of (ortho) $CH_3$, (para) $CH_3$, (ortho) Cl, (meta) Cl, and (para) Cl.

Examples of specific aryl amines are N,N'-diphenyl-N,N'-bis(alkylphenyl)-1,1-biphenyl-4,4'-diamine wherein alkyl is selected from the group consisting of methyl, such as 2-methyl, 3-methyl and 4-methyl, ethyl, propyl, butyl, hexyl, and the like. With chloro substitution, the amine is N,N'-diphenyl-N,N'-bis(halo phenyl)-1,1'-biphenyl-4,4'-diamine wherein halo is 2-chloro, 3-chloro or 4-chloro. Other known hole transporting compounds can be selected.

Examples of the highly insulating and transparent resinous material or inactive binder resinous material for the transport layers include materials such as those described in U.S. Pat. No. 3,121,006, the disclosure of which is totally incorporated herein by reference. Specific examples of organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the resinous binder contains from about 10 to about 75 percent by weight of the active material corresponding to the foregoing formula, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

The invention will now be described in detail with reference to specific preferred embodiments thereof, it being understood that these examples are intended to be illustrative only. The invention is not intended to be limited to the materials, conditions, or process parameters recited herein, it being noted that all parts and percentages are by weight unless otherwise indicated. Comparative data and Examples are also presented.

EXAMPLE I

Synthesis of Type I Titanyl Phathalocyanine

To a 300 milliliter three-necked flask fitted with mechanical stirrer, condenser and thermometer maintained under an argon atmosphere was added 32.7 grams (grams) (0.225 mole) of 1,3-diiminoisoindolene, 170 milliliters of N-methyl pyrrolidone and 15.99 grams (0.056 mole) of titanium tetrapropoxide (all the aforementioned reagents are available from Aldrich Chemical Company). The resulting mixture was stirred and warmed to reflux (about 198° C.) for 2 hours. The resultant black suspension was cooled to about 160° C. then was filtered by suction through a 350 milliliter M-porosity sintered glass funnel which had been preheated with boiling dimethyl formamide (DMF). The solid resulting was washed with two 150 milliliter portions of boiling DMF and the filtrate, initially black, became a light blue-green color. The solid was slurried in the funnel with 150 milliliters of boiling DMF and the suspension was filtered. The resulting solid was washed in the funnel with 150 milliliters of DMF at 25° C. then with 50 milliliters of methanol. The resultant shiny dark blue solid was dried at 70° C. overnight to yield 17.4 grams (54 percent) of pigment which was identified as Type I TiOPc on the basis of its XRPD. The elemental analysis of the product was: C, 66.44; H, 2.62; N, 20.00; Ash (TiO$_2$), 12.35. TiOPc requires: C, 66.67; H, 2.80; N, 19.44; Ash, 13.86.

EXAMPLE II

Synthesis of Type I Titanyl Phthalocyanine

A 1 liter three-necked flask fitted with mechanical stirrer, condenser and thermometer maintained under an atmosphere of argon was charged with diiminoisoindolene (94.3 grams, 0.65 mole), titanium tetrabutoxide (55.3 grams, 0.1625 mole; Aldrich) and 650 milliliters of 1-chloronaphthalene. The mixture was stirred and warmed. At about 140° C., the mixture turned dark green and began to reflux. At this time the condenser was removed and the vapor (this was identified as n-butanol by gas chromatography) was allowed to escape until the reflux temperature reached 230° C. The reaction was maintained at about this temperature for one and one half hours then was cooled to 15° C. Filtration using a 1 liter sintered glass funnel and washing with boiling DMF, then methanol, as in Example I provided 69.7 grams (74 percent yield) of blue pigment which was identified as Type I TiOPc by XRPD.

The elemental analysis of the product was: C, 67.38; H, 2.78; N, 19.10; Ash, 13.61. TiOPC requires: C, 66.67; H, 2.80; N, 19.44; Ash, 13.61.

EXAMPLE III

The titanyl phthalocyanines Type X were evaluated as photogenerators in xerographic imaging devices which were prepared by the following procedure. An aluminized Mylar substrate (4 mil) was coated with a Nylon 8 solution, prepared by dissolving 5 grams of Nylon 8 (Dainippon Ink and Chemical Company) in 16 grams of n-butanol, 24 grams of methanol and 4 grams of water using a 1 mil gap applicator. This layer was dried at 135° C. for 20 minutes; the final thickness was measured to be 0.6 micron. A dispersion of the TiOPc was prepared by ball milling 0.35 gram of the TiOPc, Type X, and poly(vinyl butyral) in 13.4 grams of butyl acetate in a 30 milliliter jar containing 70 grams of ⅛ inch stainless steel balls. The dispersion was milled for 20 hours then was coated onto the Nylon 8 layer described above using a 1 mil applicator. The thus formed photogenerating layer was dried at 100° C. for 10 minutes; its final thickness was determined to be about 0.40 micron.

Hole transporting layer solutions were prepared by dissolving 5.4 grams of N,N'-diphenyl-N,N-bis(3-methyl phenyl)-1,1'-biphenyl-4,4'-diamine, 8.1 grams of polycarbonate in 57.6 grams of chlorobenzene. The solution was coated onto the TiOPc generator layer using an 8 mil film applicator. The charge transporting layer thus obtained was dried at 115° C. for 60 minutes to provide a final thickness of about 23 microns.

The xerographic electrical properties of the photoresponsive imaging members were determined by electrostatically charging the surface thereof with a corona discharge source until the surface potential as measured by a capacitatively coupled probe attached to an electrometer attained an initial dark value, $V_0$, of −800 volts. After resting for 0.5 second in the dark, the charged member reached a surface potential, $V_{ddp}$, or dark development potential. The member was then exposed to filtered light from a Xenon lamp. A reduction in surface potential from $V_{ddp}$ to a background potential, $V_{bg}$, due to the photodischarge effect was observed. The dark decay in volts per second was calculated as $(V_0-V_{ddp})/0.5$. The percent of photodischarge was calculated as $100\times(V_{ddp}-V_{bg})/V_{ddp}$. The half-exposure energy, $E_{\frac{1}{2}}$, the required exposure energy causing reduction of the $V_{ddp}$ to half of its initial value, was determined. The wavelength of light selected was 800 nanometers.

EXAMPLE IV

Preparation of Type X Titanyl Phthalocyanine

To a solution of trifluoroacetic acid (4 milliliters) in methylene chloride (16 milliliters) stirred with a magnet in a 50 milliliters Erlenmeyer flask was added 2 grams of Type I TiOPc, synthesized as in Example II, over a 10 second period. No heat was evolved and the resultant dark green solution, which contained no undissolved material, was stirred at room temperature for 5 minutes. The solution was poured over a 1 minute period into a solution of methanol (100 milliliters) and water (100 milliliters) contained in a 250 milliliter Erlenmeyer flask, which was stirred with a 25 millimeters long magnetic stir bar at a rate which was sufficient to create a vortex, which extended almost to the bottom of the flask. Following the addition, the resultant blue suspension was stirred at room temperature for 45 minutes, then was allowed to stand undisturbed for 25 minutes. The yellowish brown supernatant liquid was almost completely separated from the precipitated solid by carefully decanting the reaction vessel. The remaining blue residue was redispersed in 100 milliliters of methanol by stirring with a magnet for 1 hour at room temperature (about 25° C. throughout). The resultant suspension was filtered through a 7 centimeter diameter glass fiber filter in a porcelain filter funnel. It was then redispersed in 100 milliliters hot (>90° C.) of water and filtered again. This hot water wash was repeated until the conductivity of the filtrate was measured with a laboratory cell fixture with electrodes to be less than 20 μS. The product Type X phthalocyanine was then redispersed in 100 milliliters of fluorobenzene by stirring for 15 minutes. The solution was then filtered as illustrated herein, and dried at 75° C. overnight (18 hours) to provide 1.7 grams (85 percent yield) of dark blue pigment which was identified as Type X TiOPc by XRPD.

The resulting Type X pigment was selected for use as a photogenerator in the layered imaging member of Example III, evidencing a dark decay of 23 to 25 volts per second, and an $E_{\frac{1}{2}}$ of 1.1 ergs/cm$^2$. Discharge at 5 and 10 ergs/cm$^2$ was 85 and 89 percent, respectively.

EXAMPLE V

Preparation of Type X Titanyl Phthalocyanine

To a solution of trifluoroacetic acid (4 milliliters) in methylene chloride (16 milliliters) stirred with a magnet in a 50 milliliter Erlenmeyer flask was added 2 grams of Type I TiOPc, synthesized as in Example II, over a 10 second period. No heat was evolved and the resultant dark green solution, which contained no undissolved material, was stirred at room temperature for 5 minutes. The solution was poured over a 1 minute period into a solution of methanol (100 milliliters) and water (100 milliliters) contained in a 250 milliliter Erlenmeyer flask, which was stirred with a 25 millimeters long magnetic stir bar at a rate which was sufficient to create a vortex, which extended almost to the bottom of the flask. Following the addition, the resultant blue suspension was stirred at room temperature for 45 minutes, then was allowed to stand undisturbed for 25 minutes. The yellowish brown supernatant liquid was almost completely separated from the precipitated solid by carefully decanting the reaction vessel. The remaining blue residue was redispersed in 100 milliliters of methanol by stirring with a magnet for 1 hour at room temperature. The resultant suspension was filtered through a 7 centimeter diameter glass fiber filter in a porcelain filter funnel. It was then redispersed in 100 milliliters of hot (>90° C.) water and filtered again. This hot water wash was repeated until the conductivity of the filtrate was measured to be less than 20 μS. The product Type X phthalocyanine was then dried at 75° C. overnight (18 hours) to provide 1.7 grams (85 percent yield) of dark blue pigment which was identified as Type X TiOPc by XRPD.

The resulting Type X pigment was selected for use as a photogenerator in the layered imaging member of Example III, evidencing a dark decay of 26 to 30 volts per second, and an $E_{\frac{1}{2}}$ of 1.4 ergs/cm$^2$. Discharge at 5 and 10 ergs/cm$^2$ was 82 and 87 percent, respectively.

Other modifications of the present invention may occur to those skilled in the art subsequent to a review of the present application. The aforementioned modifications, including equivalents thereof are intended to be included within the scope of the present invention.

What is claimed is:

1. A process for the preparation of titanyl phthalocyanine Type X consisting of dissolving titanyl phthalocyanine Type I in a solution of trifluoroacetic acid and methylene chloride; adding the resultant solution to a solvent mixture of alcohol and water in a ratio range of from 60:40 to 35:65 enabling the precipitation of Type X titanyl phthalocyanine; separating the titanyl phthalocyanine Type X from the solution; followed by a first washing with an aliphatic alkane alcohol wherein alkane contains from 1 to about 10 carbon atoms and a second washing with water; and thereafter a solvent treatment with fluorobenzene.

2. A process in accordance with claim 1 wherein the solvent treatment comprises slurrying the washed Type X titanyl phthalocyanine at about 25° C. in from about 10 volume parts to about 100 volume parts of fluorobenzene for a period of from about 1 minute to about 30 minutes.

3. A process for the preparation of titanyl phthalocyanine consisting of dissolving a titanyl phthalocyanine in a solution of trihaloacetic acid and an alkylene halide wherein alkylene contains from 1 to about 6 carbon atoms; adding the solution to a stirred mixture of an alcohol and water in a ratio range of from 60:40 to 35:65 whereby a precipitate results; separating the titanyl phthalocyanine Type X from the solution followed by an optional first washing and thereafter a second washing with fluorobenzene.

4. A process in accordance with claim 3 wherein the titanyl phthalocyanine is dissolved in a mixture of trifluoroacetic acid and methylene chloride.

5. A process in accordance with claim 3 wherein the titanyl phthalocyanine is dissolved in a 1:4 mixture of trifluoroacetic acid and methylene chloride.

6. A process in accordance with claim 1 wherein the solvent mixture is comprised of methanol and water.

7. A process in accordance with claim 1 wherein the solvent mixture is comprised of methanol and water in a ratio of from about 60 percent of methanol and 40 percent of water to about 35 percent of methanol and about 65 percent of water.

8. A process in accordance with claim 1 wherein the solvent mixture is comprised of methanol and water in a ratio of from about 50 percent of methanol and about 50 percent of water.

9. A process in accordance with claim 1 wherein the second washing is accomplished with water which is heated to a temperature of from about 60° to about 100° C.

10. A process in accordance with claim 1 wherein washing is accomplished with hot water until the conductivity of the filtrate resulting is less than 20 μS (microsiemans).

11. A process in accordance with claim 9 wherein the water is present in an amount of from about 10 volume parts to about 100 volume parts for each part by weight of titanyl phthalocyanine that was dissolved.

12. A process in accordance with claim 1 wherein the fluorobenzene is monofluorobenzene.

13. A process in accordance with claim 1 wherein the fluorobenzene treatment is accomplished by retaining the titanyl phthalocyanine in solution for a period of from about 5 minutes to about 45 minutes.

14. A process in accordance with claim 1 wherein the amount of fluorobenzene selected is from about 10 volume parts to about 100 volume parts for each part by weight of titanyl phthalocyanine that was dissolved.

15. A process in accordance with claim 3 wherein the resulting titanyl phthalocyanine Type X is dried by heating at a temperature of from about 70° C. to about 150° C.

16. A process in accordance with claim 3 wherein the resulting titanyl phthalocyanine Type X is dried by heating at a temperature of from about 70° C. to about 150° C. for a period of from about 1 to about 15 hours.

17. A process for the preparation of titanyl phthalocyanine Type X consisting of dissolving titanyl phthalocyanine Type I in a solution of trifluoroacetic acid and methylene chloride; adding the solution to a stirred mixture of an aliphatic alkane alcohol wherein alkane contains from 1 to 10 carbon atoms and water in a ratio range of from 60:40 to 35:65 whereby a precipitate results; recovering the desired titanyl phthalocyanine Type X; followed by washing with fluorobenzene.

18. A process for the preparation of titanyl phthalocyanine Type X consisting of the reaction of a titanium alkoxide with diiminoisoindoline in a solvent of chloronaphthalene; dissolving the obtained Type I titanyl phthalocyanine in solvent comprised of trifluoroacetic acid and methylene chloride; reprecipitating the dissolved pigment by addition to a stirred mixture of methanol and water in a ratio range of from 60:40 to 35:65; and subsequently washing the Type X titanyl phthalocyanine obtained with fluorobenzene.

19. A process in accordance with claim 18 wherein the diiminoisoindoline is 1,3, diiminoisoindoline.

20. A process in accordance with claim 18 wherein the addition of the titanium alkoxide is accomplished subsequent to dissolving the diiminoisoindoline in chloronaphthalene.

* * * * *